(12) United States Patent
Carella

(10) Patent No.: US 11,540,519 B2
(45) Date of Patent: Jan. 3, 2023

(54) METHOD, DEVICE, AND SYSTEM OF MOLD, MOSS, AND ALGAE MITIGATION FOR ASPHALT ROOFING

(71) Applicant: Gary Carella, Bohemia, NY (US)

(72) Inventor: Gary Carella, Bohemia, NY (US)

( * ) Notice: Subject to any disclaimer, the term of this patent is extended or adjusted under 35 U.S.C. 154(b) by 0 days.

(21) Appl. No.: 17/449,120

(22) Filed: Sep. 28, 2021

(65) Prior Publication Data

US 2022/0110329 A1 Apr. 14, 2022

Related U.S. Application Data

(60) Provisional application No. 63/091,011, filed on Oct. 13, 2020.

(51) Int. Cl.
*A01N 59/20* (2006.01)
*E04D 1/30* (2006.01)

(52) U.S. Cl.
CPC .............. *A01N 59/20* (2013.01); *E04D 1/30* (2013.01); *E04D 2001/305* (2013.01); *E04D 2001/308* (2013.01)

(58) Field of Classification Search
CPC .... A01N 59/20; E04D 1/30; E04D 2001/305; E04D 2001/308
USPC .......................................................... 52/518
See application file for complete search history.

(56) References Cited

U.S. PATENT DOCUMENTS

| | | | | |
|---|---|---|---|---|
| 1,589,719 A | * | 6/1926 | Ritter | E04D 1/34 52/518 |
| 1,744,656 A | * | 1/1930 | Mcdavitt | E04D 1/26 52/518 |
| 1,869,521 A | * | 8/1932 | Souviron | C01G 3/10 423/557 |
| 3,208,871 A | * | 9/1965 | Langseth | E04D 7/005 428/221 |
| 3,513,586 A | * | 5/1970 | Gushue | A01M 1/245 43/124 |
| 3,888,176 A | * | 6/1975 | Horai, Jr. | A01N 25/26 106/18.36 |
| 4,079,561 A | * | 3/1978 | Vallee | E04D 1/30 52/529 |

(Continued)

FOREIGN PATENT DOCUMENTS

| | | | | |
|---|---|---|---|---|
| DE | 19525688 A1 | * | 1/1997 | ............. A01N 59/20 |
| DE | 20317968 U1 | * | 2/2004 | ............... E04D 1/30 |

(Continued)

*Primary Examiner* — James M Ference
*Assistant Examiner* — Joseph J. Sadlon
(74) *Attorney, Agent, or Firm* — Dunlap Bennett & Ludwig, PLLC

(57) ABSTRACT

A microbial inhibiting system for angled asphalt roofs. The system includes copper-based strips along the ridge of the roof, wherein the proximal edges of the copper-based strips are operatively associated between a ridge vent and a portion of the upper roof. A distal end of the copper-based strips may provide windshear bends to keep the whole system in place during high winds. Once installed onto an asphalt roof, the present invention is adapted so that rainwater is directed over the copper-base members of the system, causing a chemical reaction therewith, wherein the resulting chemical will wash away along the roofing membrane, removing any mold, algae, and moss as the chemically infused rainwater rolls down the roof.

4 Claims, 3 Drawing Sheets

(56) References Cited

U.S. PATENT DOCUMENTS

| | | | | |
|---|---|---|---|---|
| 4,276,732 A * | 7/1981 | Nielsen | A01N 59/20 | 422/291 |
| 4,544,595 A * | 10/1985 | Tomason | B32B 3/06 | 428/116 |
| 5,216,864 A * | 6/1993 | Urgero | A01N 59/16 | 52/515 |
| 5,666,776 A * | 9/1997 | Weaver | E04D 1/26 | 52/518 |
| 6,006,479 A * | 12/1999 | Fayle | E04H 12/2292 | 52/309.3 |
| 6,015,343 A * | 1/2000 | Castillo | E04D 13/174 | 454/365 |
| 6,164,025 A * | 12/2000 | Lindgren | E04D 13/031 | 52/200 |
| 6,167,660 B1 * | 1/2001 | Sama | E04D 13/1415 | 52/58 |
| 6,213,868 B1 * | 4/2001 | Sells | E04D 13/174 | 454/359 |
| 6,253,495 B1 * | 7/2001 | Weber | E04D 13/00 | 52/24 |
| 6,343,985 B1 * | 2/2002 | Smith | E04D 13/176 | 454/365 |
| 6,602,465 B2 * | 8/2003 | Ostby | E01B 9/28 | 422/23 |
| 6,776,322 B2 * | 8/2004 | Villela | B25C 7/00 | 227/19 |
| 6,912,813 B2 * | 7/2005 | Grizenko | E04D 3/40 | 49/471 |
| 8,549,802 B2 * | 10/2013 | Thagard, III | B29C 44/02 | 52/198 |
| 8,703,166 B1 * | 4/2014 | Flynn | A01N 25/12 | 424/641 |
| 9,103,124 B2 * | 8/2015 | Spencer | E04D 13/002 | |
| 10,000,931 B1 * | 6/2018 | Daugherty | A01N 59/16 | |
| 10,113,760 B2 * | 10/2018 | Rotter | F24F 7/02 | |
| 10,202,771 B2 * | 2/2019 | Edgson | B29C 44/02 | 52/198 |
| 2003/0150170 A1 * | 8/2003 | Weber | E04D 13/00 | 52/1 |
| 2005/0103409 A1 * | 5/2005 | Weber | F24S 40/20 | 148/684 |
| 2005/0241248 A1 * | 11/2005 | Ridenour | E04D 13/174 | 52/198 |
| 2007/0039252 A1 * | 2/2007 | Railkar | E04D 13/002 | 52/44 |
| 2012/0045522 A1 * | 2/2012 | Siddall | A61P 31/00 | 424/638 |
| 2015/0089895 A1 * | 4/2015 | Leitch | E04D 1/28 | 52/518 |

FOREIGN PATENT DOCUMENTS

| | | | | |
|---|---|---|---|---|
| DE | 202007012561 U1 * | 11/2007 | | A01N 59/20 |
| DE | 202007016207 U1 * | 3/2008 | | A01N 59/16 |
| DE | 202007016208 U1 * | 3/2008 | | A01N 59/16 |
| DE | 202008003219 U1 * | 7/2008 | | A01N 59/20 |
| FR | 2610344 A1 * | 8/1988 | | E04D 13/002 |
| GB | 2360046 A * | 9/2001 | | E04D 13/004 |
| GB | 2424063 A * | 9/2006 | | E04D 1/30 |
| GB | 2510919 A * | 8/2014 | | F24S 40/40 |
| WO | WO-0133009 A1 * | 5/2001 | | E04D 1/3402 |
| WO | WO-2020122727 A1 * | 6/2020 | | E04D 13/147 |

* cited by examiner

US 11,540,519 B2

METHOD, DEVICE, AND SYSTEM OF MOLD, MOSS, AND ALGAE MITIGATION FOR ASPHALT ROOFING

CROSS-REFERENCE TO RELATED APPLICATION

This application claims the benefit of priority of U.S. provisional application Ser. No. 63/091,011, filed 13 Oct. 2020, the contents of which are herein incorporated by reference.

BACKGROUND OF THE INVENTION

The present invention relates to roofing products and more particularly, to a method, device, and system of mold, algae, and moss removal for asphalt roofing.

Algae, fungal, mold, mildew, lichen, moss, and other microbial growth can be found on asphalt roofs. Although not a threat to the structural integrity of the asphalt roof, such growth can be unsightly and even pose health risks to the inhabitants of the home. Removing algae and other microorganisms from an asphalt roof's outer surface can be costly, too. And if the problem is not resolved, it can lower property values. Unfortunately, the mold, algae, and moss feed on limestone which is a major component of asphalt shingles. If not resolved, the roof shingle will continue to deteriorate, especially when one considers that mold, algae, and moss continue to feed on the limestone.

As can be seen, there is a need for a method, device, and system of inhibiting mold, algae, and moss growth on asphalt roofing. The present invention embodies copper-based members configured to interact with rainfall to effectively and effortlessly remove mold, algae, and moss on angled asphalt roofs. The present invention also embodies an attached ridge vent that sandwiches a proximal portion of the copper-based members to the asphalt roofing surface, wherein the distal ends of the copper-based members provide structural bends which creates a windshear to withstand high winds, unlike other systems, which tend to give way during strong winds due to not being built to withstand windshear.

Once installed onto an asphalt roof of a home, the present invention is adapted so that rainwater is directed over the copper-base members of the system, causing a reaction therewith, wherein the resulting chemical will wash away along the roofing membrane, removing any mold, algae, and moss as the chemical infused rainwater rolls down the roof.

SUMMARY OF THE INVENTION

In one aspect of the present invention, an antimicrobial system for an angled asphalt roof, the system including one or more copper-based members along an upper portion of the angled roof, wherein the copper-based member is composed to react with rainwater to form a copper sulfate chemical.

In another aspect of the present invention, the system further includes wherein each copper-based member is a planar strip, wherein a distal end of each planar strip terminates in an approximately 180-degree windshear bend, further comprising a ridge vent, wherein a proximal end of each planar strip is sandwiched against the angled roof by way of the ridge vent; and includes an adhesive connecting the proximal end to the ridge vent; and one or more copper nails connecting the ridge vent, through the proximal end, to the roof.

In yet another aspect of the present invention, an antimicrobial assembly for an angled asphalt roof, an assembly includes: one or more copper-based members along an upper portion of the angled roof, wherein the copper-based member is composed to react with rainwater to form a copper sulfate chemical, wherein each copper-based member is a planar strip, wherein a distal end of each planar strip terminates in an approximately 180-degree windshear bend; a ridge vent; and an adhesive connecting a proximal end to a lower portion of the ridge vent.

In still yet another aspect of the present invention, a method of inhibiting microbial growth along an angled asphalt roof, the method includes the following: attaching one or more copper-based planar members along an upper portion of the angled asphalt roof, wherein the one or more copper-based planar members are composed to react with rainwater to form a copper sulfate chemical; forming approximately 180-degree windshear bends in a distal end of the one or more copper-based planar members; sandwiching a proximal portion of the one or more copper-based planar members to the angled asphalt roof by way of a ridge vent; and connecting the one or more copper-based planar members to the angled asphalt roof with a plurality of copper nails, wherein the ridge vent provides an upper surface that is has a ridge angle that is approximately equal to a roof angle of the angled asphalt roof, whereby the rainwater is directed to one of the one or more copper-based members.

These and other features, aspects and advantages of the present invention will become better understood with reference to the following drawings, descriptions, and claims.

DETAILED DESCRIPTION OF THE INVENTION

Figure 1:
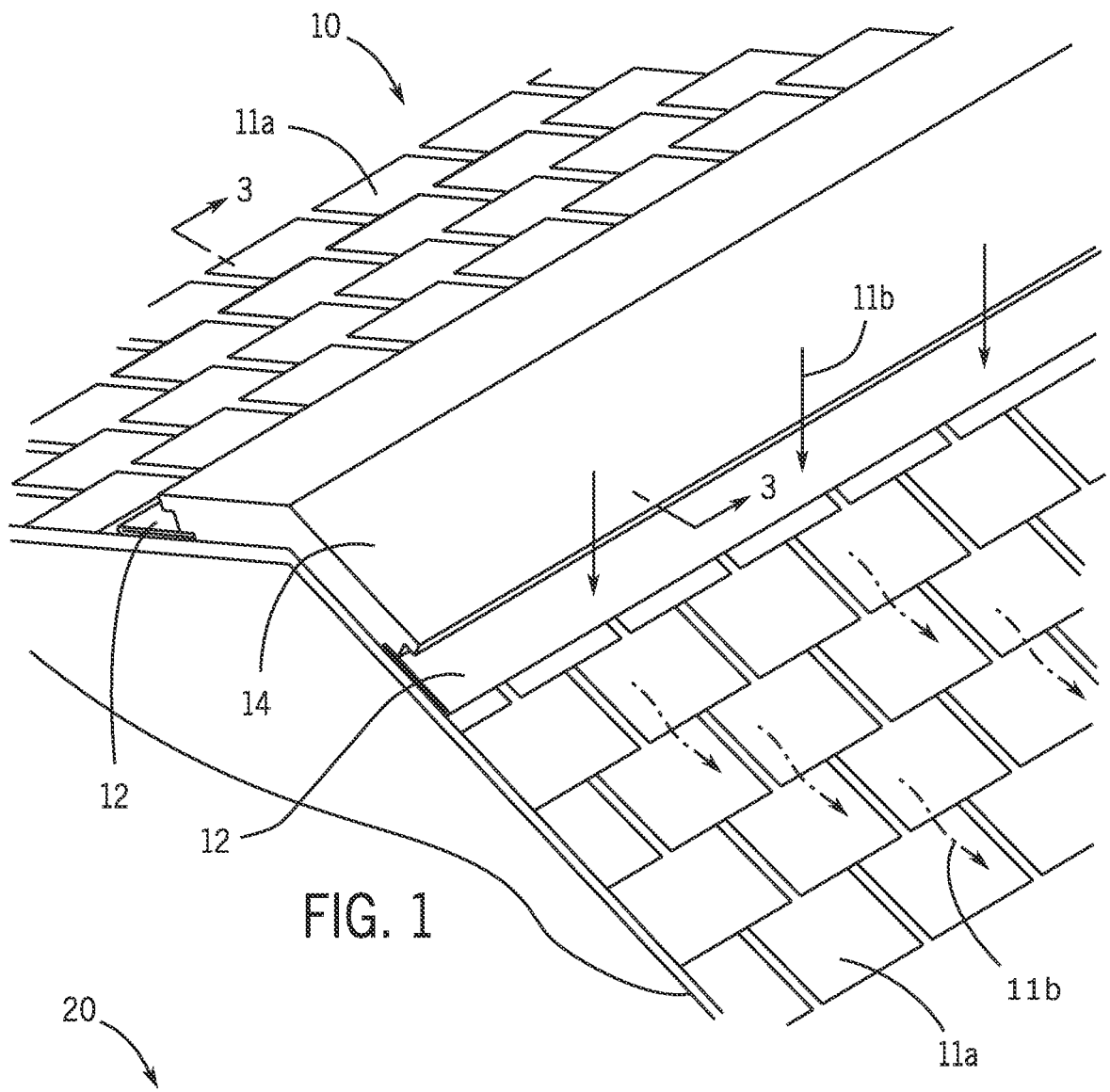
FIG. 1 is a top perspective view of an exemplary embodiment of the present invention, shown in use.
Figure 2:
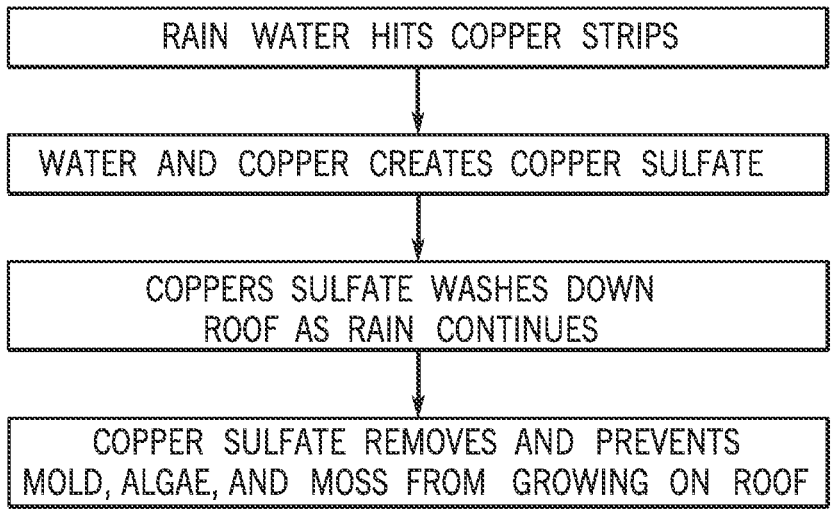
FIG. 2 is a flowchart 20 of an exemplary embodiment of the present invention.

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Broadly, an embodiment of the present invention provides a microbial inhibiting system for asphalt angled roofs. The system includes copper-based strips along the ridge of the roof, wherein the proximal edges of the copper-based strips are operatively associated between a ridge vent along or adjacent to a ridge of the upper roof. A distal edge of the copper-based strips has windshear bends to keep the whole system secured to the roof during high winds. Once installed onto an asphalt roof, the present invention is adapted so that rainwater is directed over the copper-based members of the system, causing a reaction therewith, wherein the resulting chemical will wash away along the roofing membrane, removing any mold, algae, and moss as the rainwater rolls down the roof.

Referring to FIGS. 1 through 6, the present invention may include a method, device, and system of mold, algae, and moss mitigation for asphalt roofing. The system 10 of the present invention may include a ridge vent 14 that sandwiches one or more copper-based members 12 against the roof membrane 11a. The ridge vent 14 may be attached along the ridge of the angled asphalt roof so that the ridge vent 14 directs rainfall 11b over the one or more copper-based members 12, which with the copper-based properties of the members 12, forming a copper sulfate byproduct that rolls down the lower roof membrane 11a by operation of gravity.

The copper-based components of the copper-based member 12 is composed to react with the water of the rainfall 11b to form a copper sulfate chemical, wherein the copper sulfate-based byproduct runs over the roof membrane 11a, inhibiting the growth of mold, algae, moss, and other microbial organisms there along.

Figure 3:
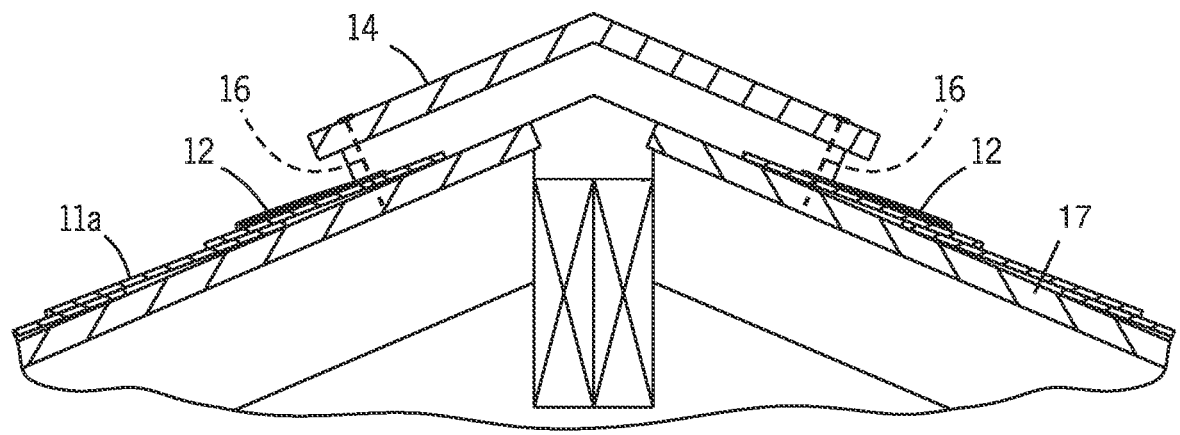
FIG. 3 is a cross-sectional view of an exemplary embodiment of the present invention.
Figure 4:
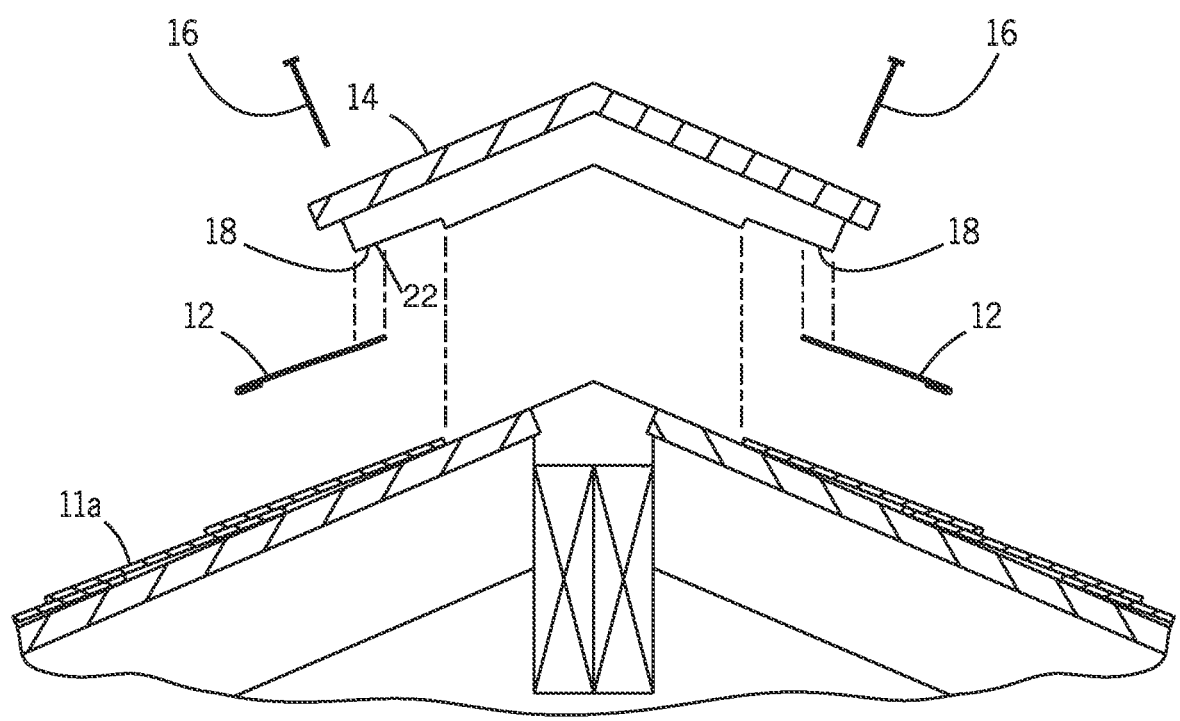
FIG. 4 is a cross-sectional view of an exemplary embodiment of the present invention.

Copper fasteners 16 (1.5" copper nails) are used to connect the ridge vent 14 to the roofing members 17 supporting the roof shingles 11a by way of passing through the copper-based members 12, as illustrated in FIGS. 3 and 4. In an alternative embodiment, the members 12 are copper-based so that copper fasteners 16 penetrating the copper-based member 12 composes a copper-sulfate agent that is created when interacting with rainfall 11b so as to form the copper sulfate chemical.

Separately, a peripheral edge 22 of a lower portion of the ridge vent 14, such as the bottom of its supporting wall/framing, is connected with copper nails to a proximal end/edge (or overlap portion) 12c of the copper-based member 12. This connection facilitates installation as well as adding support to the copper-based member 12.

The copper-based member 12 may be a planar strip of consistent widths, thicknesses and lengths, including but not limited to 6" in width×¼" thickness×5 ft in length. The copper-based member 12 could be wider or thinner than six inches, have a thickness greater or less than ¼, and the copper-based member 12 could be various lengths.

Figure 6:
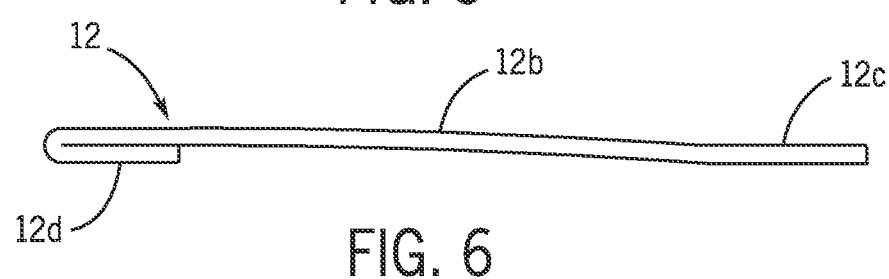
FIG. 6 is a side elevation view of an exemplary embodiment of a copper-based member of the present invention.

The planar strip of copper-based member 12 may be dimensioned and adapted to provide, in certain embodiments, a 2-inch overlap 12c underneath ridge vent 14, exposing a remaining active/exposed portion 12b proximal of the turn back 12d, as illustrated in FIG. 6. A distal end of the copper-based member 12 may have a turn-back portion 12d to prevent water/rainfall 11b from getting underneath the copper-based member 12. The turn back 12d may also be considered a windshear bend that prevents wind from getting underneath the copper-based member 12. The length of the turn back 12d may be ¼ to two inches; in certain embodiments, it may be one inch.

Figure 5:
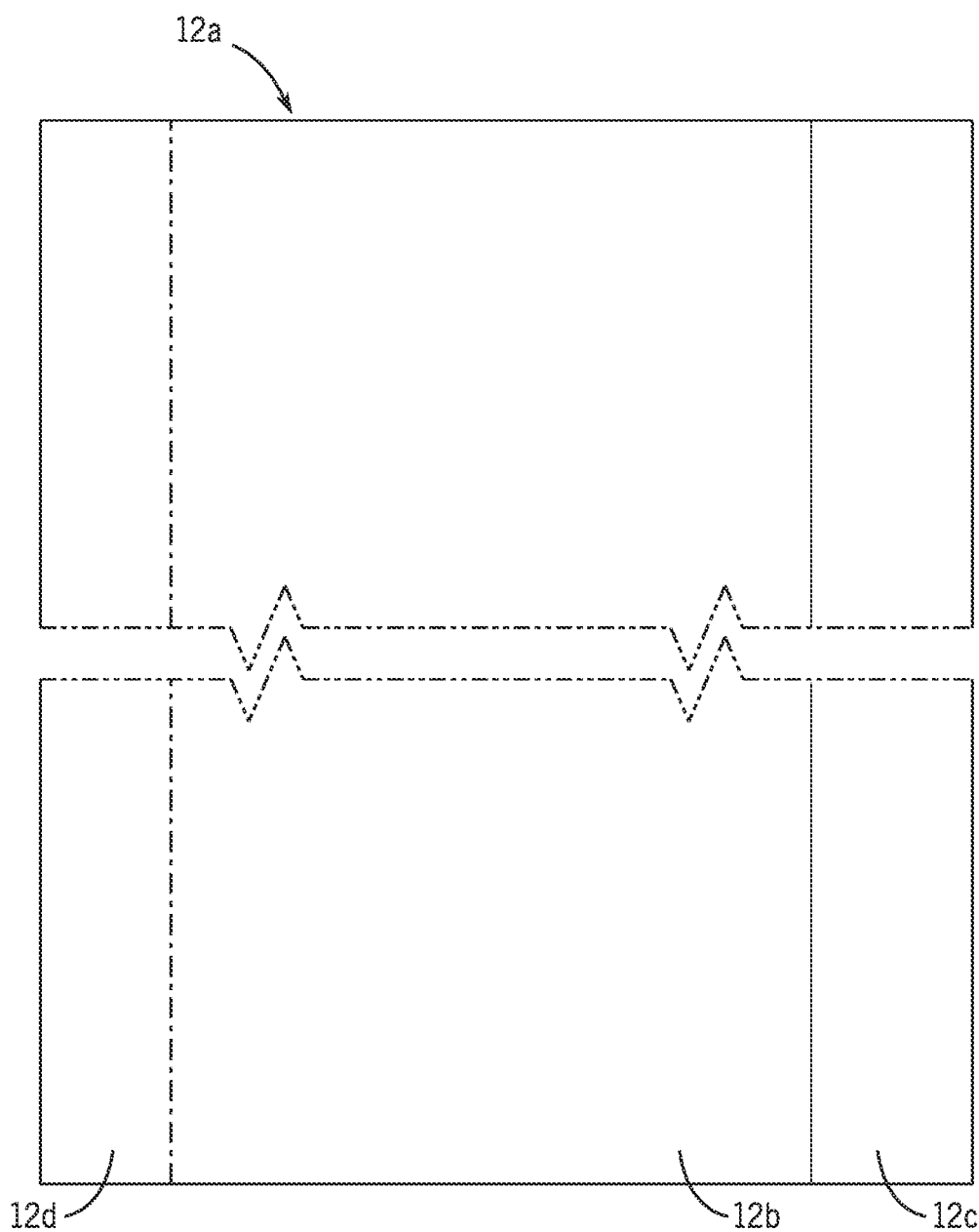
FIG. 5 is a top plan view of an exemplary embodiment of a copper-base member blank of the present invention.

The copper-based member 12 must be made from 24 gauge, 16 oz, 99.9% copper sheet or blank 12a, as illustrated in FIG. 5, that must include a (preformed) one-inch 180-degree bend (the turnback 12d) on the distal edge of strip, thereby creating a windshear bend.

In short, a device of the present invention will include the ridge vent 12 and two opposing copper-based members 12 attached to each outer, bottom edge of the ridge vent 14 using 1.5-inch copper roofing nails 16.

A method of installing the present invention will include two copper-based members 12 and adhesively attaching each of them to each lower edge 22 of ridge vent 14. The ridge vent 14 is, in some embodiments, 10.5" in width×4 ft-10" in length. Then this assembly is attached to the ridge of an angled asphalt roof using 1.5-inch copper roofing nails 16.

Once installed along the ridge of the roof, rainwater 11b that hits the one or more copper-based members 12 of the present invention system will roll down the roof removing mold, algae, and moss by way of chemical agents created from the reaction between the copper-based members 12 and the rainwater 11b.

As used in this application, the term "about" or "approximately" refers to a range of values within plus or minus 10% of the specified number. And the term "substantially" refers to up to 90% or more of an entirety.

It should be understood, of course, that the foregoing relates to exemplary embodiments of the invention and that modifications may be made without departing from the spirit and scope of the invention as set forth in the following claims.

What is claimed is:

1. An antimicrobial assembly for an angled asphalt roof, the assembly comprising of one or more copper-based strips along an upper portion of the angled asphalt roof, wherein each copper-based strip is planar and has an active portion composed to react with rainwater to form a copper sulfate chemical, wherein a distal end of each copper strip back in an approximately 180-degree windshear bend so that a substantial portion of the distal end contacts an underside of the active portion;

a ridge vent;

an adhesive connecting a proximal end of each copper-based strip to a lower surface of the ridge vent, wherein the ridge vent provides an upper surface that is has a ridge angle that is approximately equal to a roof angle of the angled asphalt roof, wherein the rainwater is directed to the one or more copper-based strips, wherein the lower surface exhibits the ridge angle;

a cutout formed in the lower surface along and inward from both longitudinal edges thereof, wherein each cutout is dimensioned to receive the proximal end of each copper-based strip so that an underside of each proximal end is generally flush with the lower surface adjacent thereto; and a plurality of copper roofing nails connecting the ridge vent to the roof, wherein each copper roofing nail penetrates the proximal end, wherein the proximal end is askew relative to the active portion.

2. A method of inhibiting microbial growth along an angled asphalt roof, the method comprising:

attaching one or more copper-based planar members along an upper portion of the angled asphalt roof, wherein the one or more copper-based planar members are composed to react with rainwater to form a copper-sulfate chemical;

bending a distal end of the one or more copper-based planar members in such a way that the distal end turns back in an approximately 180-degree windshear bend so that a substantial portion of the distal end contacts an underside of the active portion;

sandwiching a proximal portion of the one or more copper-based planar members to the angled asphalt roof by way of a ridge vent, wherein the ridge vent provides an upper surface that is has a ridge angle that is approximately equal to a roof angle of the angled asphalt roof, wherein the rainwater is directed to the one or more copper-based planar members, wherein the lower surface exhibits the ridge angle;

forming a cutout in the lower surface along and inward from both longitudinal edges thereof, wherein each cutout is dimensioned to receive the proximal end of each copper-based planar member so that an underside of each proximal end is generally flush with the lower surface adjacent thereto; and nailing a plurality of copper roofing nails through the upper surface, through the cutout, through the proximal end, and into the angled asphalt roof.

3. The method of claim 2, connecting the one or more copper-based planar members to the angled asphalt roof with a plurality of copper nails.

4. The method of claim 3, wherein the ridge vent provides an upper surface that is has a ridge angle that is approximately equal to a roof angle of the angled asphalt roof, whereby the rainwater is directed to the one or more copper-based members.

\* \* \* \* \*